US009585176B2

(12) United States Patent
Li et al.

(10) Patent No.: US 9,585,176 B2
(45) Date of Patent: Feb. 28, 2017

(54) METHODS AND APPARATUS FOR OPPORTUNISTIC SCHEDULING OF PEER TO PEER LINKS IN WIDE AREA NETWORK

(75) Inventors: Junyi Li, Chester, NJ (US); Hua Wang, Bridgewater, NJ (US); Shailesh Patil, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 13/449,131

(22) Filed: Apr. 17, 2012

(65) Prior Publication Data
US 2013/0272145 A1    Oct. 17, 2013

(51) Int. Cl.
| | |
|---|---|
| *H04L 12/26* | (2006.01) |
| *H04W 76/02* | (2009.01) |
| *H04W 16/14* | (2009.01) |
| *H04W 72/04* | (2009.01) |

(52) U.S. Cl.
CPC .......... *H04W 76/023* (2013.01); *H04W 16/14* (2013.01); *H04W 72/04* (2013.01)

(58) Field of Classification Search
CPC . H04W 28/0236; H04W 36/20; H04B 17/005
USPC .......................................................... 370/252
See application file for complete search history.

(56) References Cited

U.S. PATENT DOCUMENTS

| | | | | |
|---|---|---|---|---|
| 7,013,158 B1 * | 3/2006 | Cook | ............................. | 455/519 |
| 8,190,938 B2 * | 5/2012 | Nurminen et al. | ........... | 713/323 |
| 8,594,027 B2 * | 11/2013 | Lee et al. | ....................... | 370/329 |
| 2009/0010185 A1 | 1/2009 | Li et al. | | |
| 2009/0011770 A1 * | 1/2009 | Jung | ..................... | H04L 5/0037 455/452.1 |
| 2009/0016315 A1 | 1/2009 | Laroia et al. | | |
| 2009/0325625 A1 * | 12/2009 | Hugl et al. | ..................... | 455/522 |
| 2010/0118834 A1 | 5/2010 | Kalhan | | |
| 2010/0165882 A1 | 7/2010 | Palanki et al. | | |

(Continued)

FOREIGN PATENT DOCUMENTS

| | | |
|---|---|---|
| WO | 2012015698 A1 | 2/2012 |
| WO | 2012019348 A1 | 2/2012 |

OTHER PUBLICATIONS

International Search Report and Written Opinion—PCT/US2013/036822—ISA/EPO—Aug. 12, 2013.

(Continued)

*Primary Examiner* — Shaq Taha
(74) *Attorney, Agent, or Firm* — Liem T. Do

(57) ABSTRACT

A method, a computer program product, and an apparatus are provided. The apparatus determines an availability of a wireless wide area network (WWAN) subframe, and utilizes the WWAN subframe for peer-to-peer communication when the WWAN subframe is available. Accordingly, peer mobile terminals or devices may establish direct peer-to-peer links for communicating small amounts of information without affecting the quality of existing WWAN communications. In the wireless wide area network (WWAN) scenario, communication between mobile terminals is facilitated through uplink/downlink channels between the mobile terminals and a base station (i.e., WWAN link). Therefore, for various types of applications, an efficient means of communicating a small amount of information frequently is provided that does not require large amounts of signaling overhead.

44 Claims, 15 Drawing Sheets

(56) References Cited

U.S. PATENT DOCUMENTS

| | | |
|---|---|---|
| 2010/0169498 A1 | 7/2010 | Palanki et al. |
| 2010/0254281 A1* | 10/2010 | Kim et al. .................... 370/252 |
| 2010/0260093 A1* | 10/2010 | Liu et al. ...................... 370/315 |
| 2011/0007656 A1 | 1/2011 | He et al. |
| 2011/0026645 A1* | 2/2011 | Luo et al. ..................... 375/340 |
| 2011/0110255 A1* | 5/2011 | Park et al. .................... 370/252 |
| 2011/0243010 A1 | 10/2011 | Geirhofer et al. |
| 2011/0255450 A1 | 10/2011 | Wang et al. |
| 2012/0015607 A1* | 1/2012 | Koskela et al. ................ 455/62 |
| 2012/0044815 A1 | 2/2012 | Geirhofer et al. |
| 2013/0128858 A1* | 5/2013 | Zou et al. ..................... 370/329 |
| 2013/0170387 A1* | 7/2013 | Wang .................... H04W 4/005 370/252 |
| 2013/0170470 A1* | 7/2013 | Kneckt ............. H04W 72/0446 370/330 |
| 2013/0170476 A1* | 7/2013 | Baker ............... H04W 72/0406 370/336 |
| 2013/0230032 A1* | 9/2013 | Lu ........................ H04W 72/02 370/336 |
| 2013/0272262 A1* | 10/2013 | Li et al. ........................ 370/330 |
| 2014/0094183 A1* | 4/2014 | Gao et al. ..................... 455/450 |

OTHER PUBLICATIONS

Yu, et al., Resource Sharing Optimization for Device-to-Device Communication Underlaying Cellular Networks, IEEE Transactions on Wirelss Communications, 2011, pp. 1-12.

* cited by examiner

| Slot Number | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | LTE WAN | LTE WAN | LTE WAN | LTE WAN | LTE WAN | E to F Link | LTE WAN | LTE WAN | LTE WAN | LTE WAN | LTE WAN | LTE WAN | LTE WAN | E to F Link |

METHODS AND APPARATUS FOR OPPORTUNISTIC SCHEDULING OF PEER TO PEER LINKS IN WIDE AREA NETWORK

BACKGROUND

Field

The present disclosure relates generally to communication systems, and more particularly, to opportunistic scheduling of peer to peer links in a wide area network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In a wireless wide area network (WWAN) scenario, communication between mobile terminals is facilitated through uplink/downlink channels between the mobile terminals and a base station (i.e., WWAN link). However, for various types of applications, there is a need for an efficient means of communicating a small amount of information frequently. Additionally, it would be advantageous if the frequent communication of the small amount of information did not require large amounts of signaling overhead. To address these needs, peer mobile terminals or devices may establish direct peer-to-peer links for communicating small amounts of information without affecting the quality of existing WWAN communications. In an aspect of the disclosure, a method, a computer program product, and an apparatus of wireless communication are provided in which an availability of a wireless wide area network (WWAN) subframe is determined, and the WWAN subframe is utilized for peer-to-peer communication when the WWAN subframe is available.

BRIEF DESCRIPTION OF THE DRAWINGS

FIG. 11 is a diagram illustrating the occupation of WWAN resources due to WWAN communication between peer devices.

DETAILED DESCRIPTION

Figure 1:
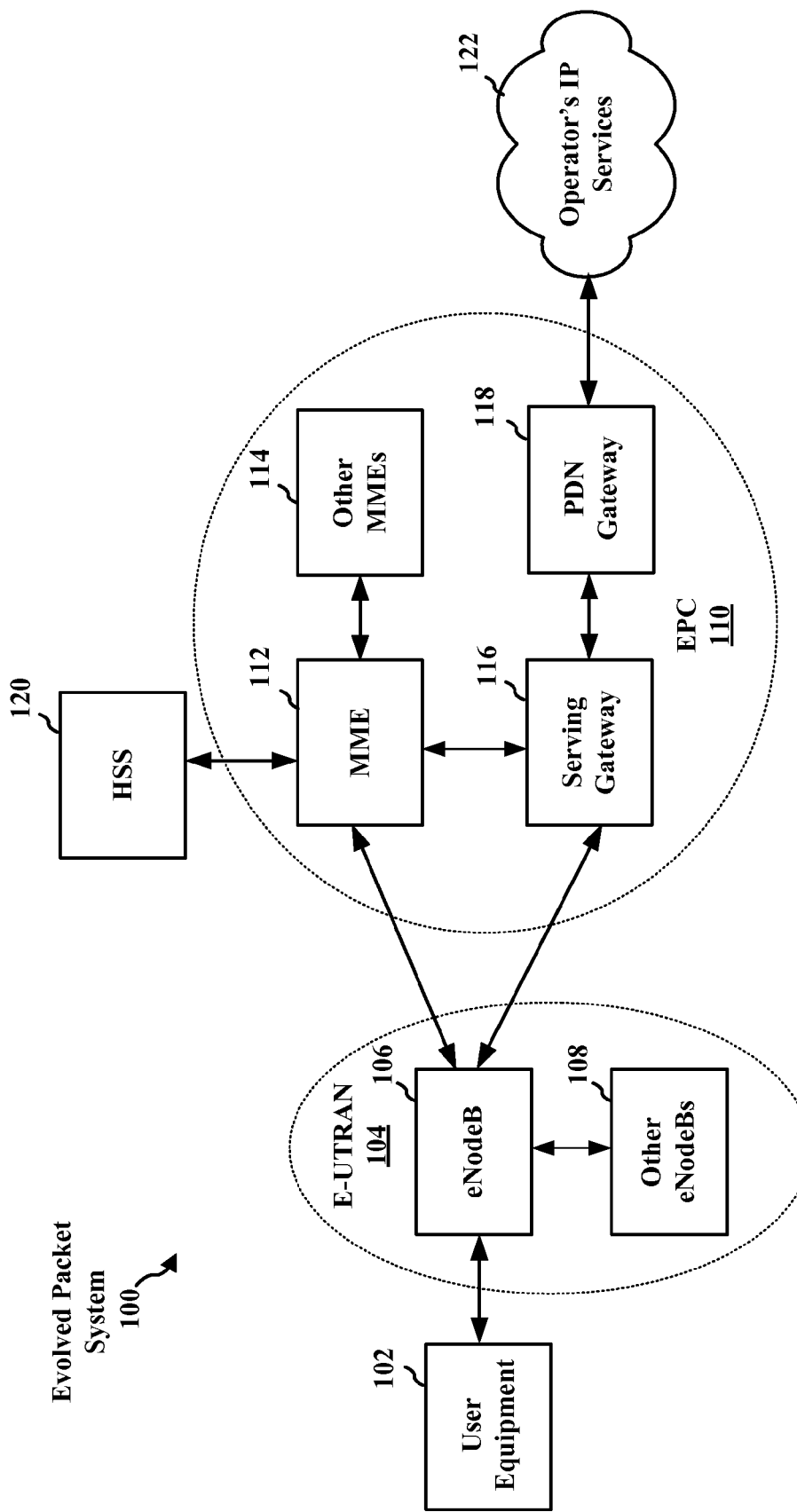
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
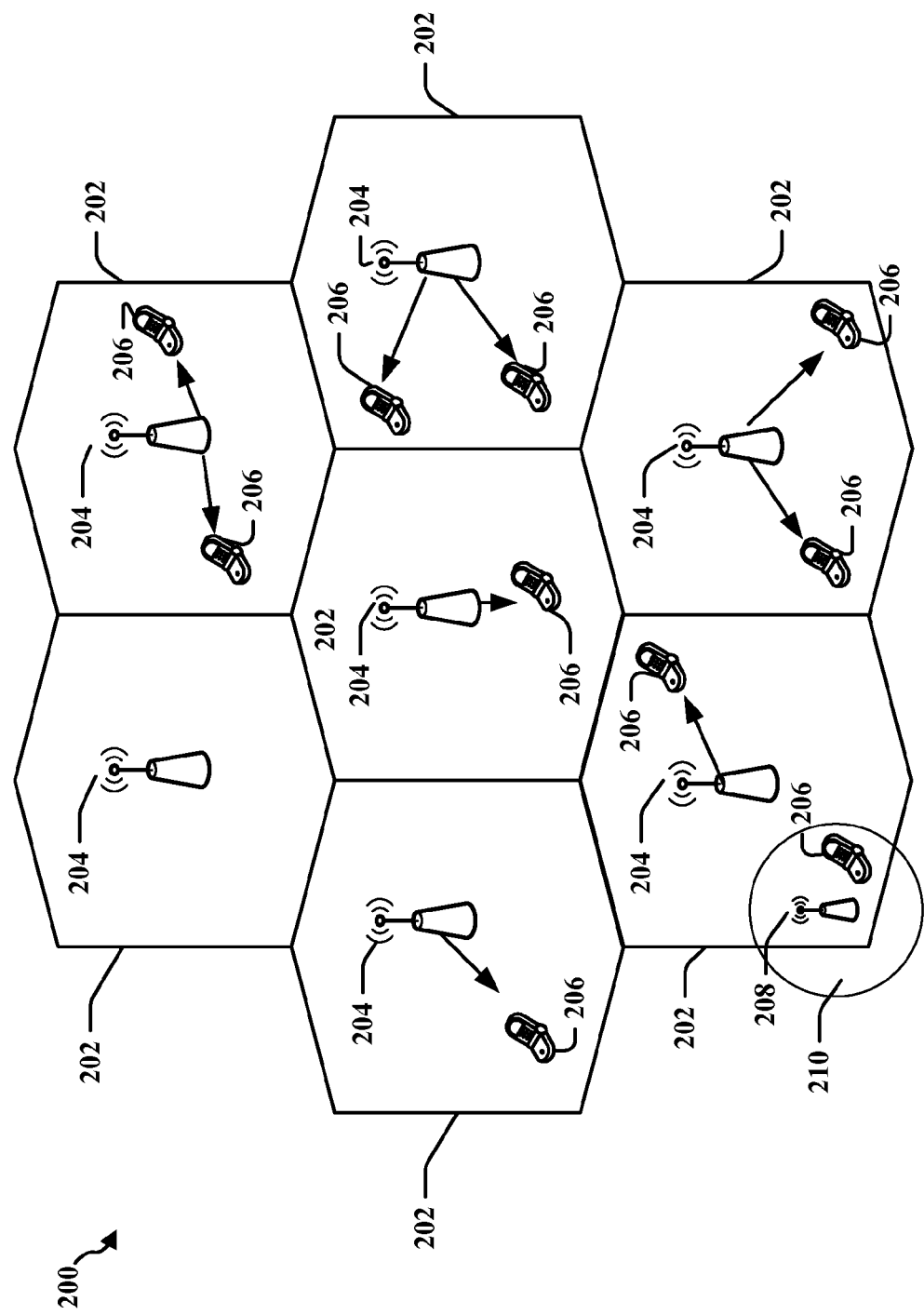
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA, UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
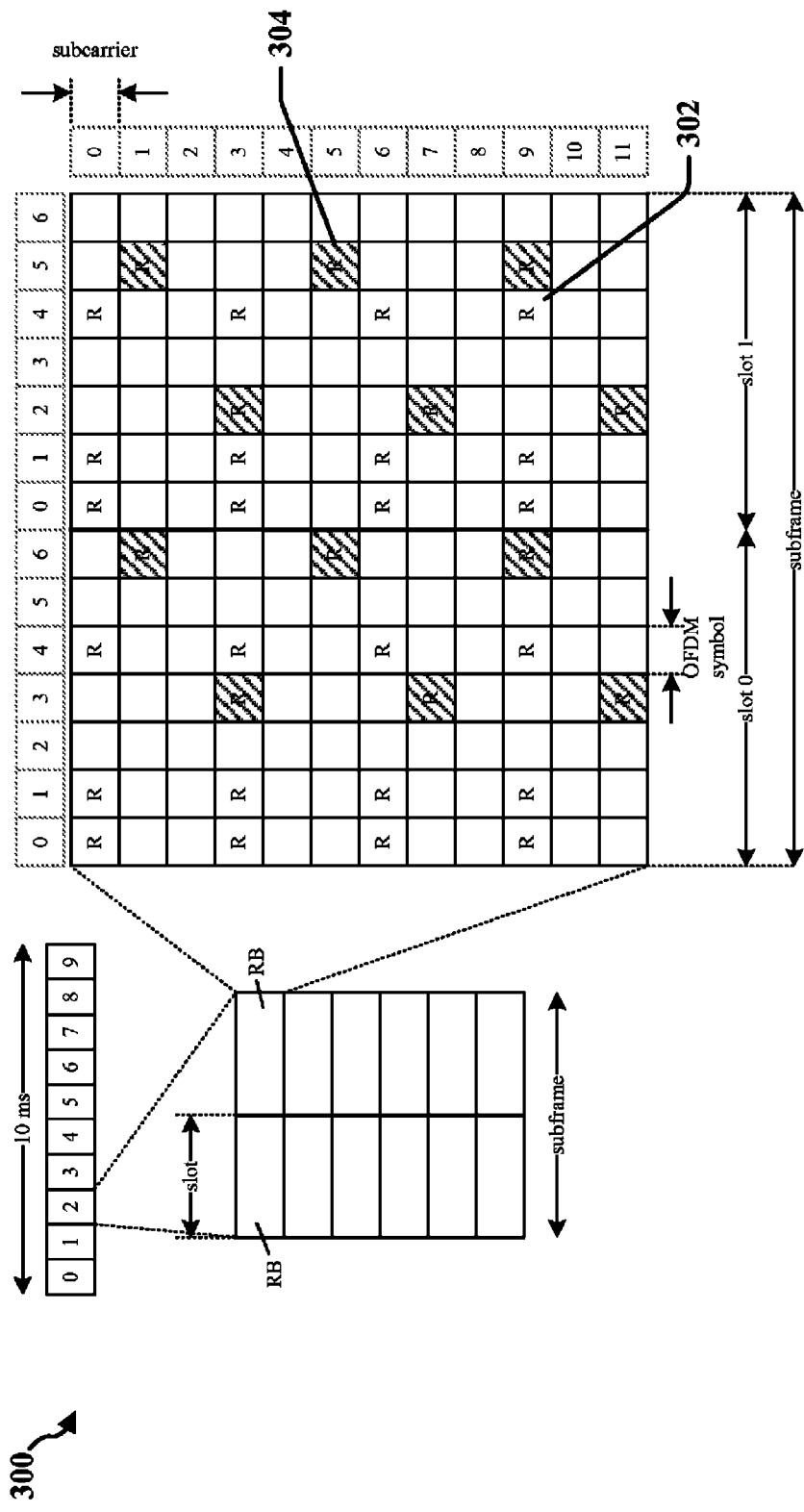
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
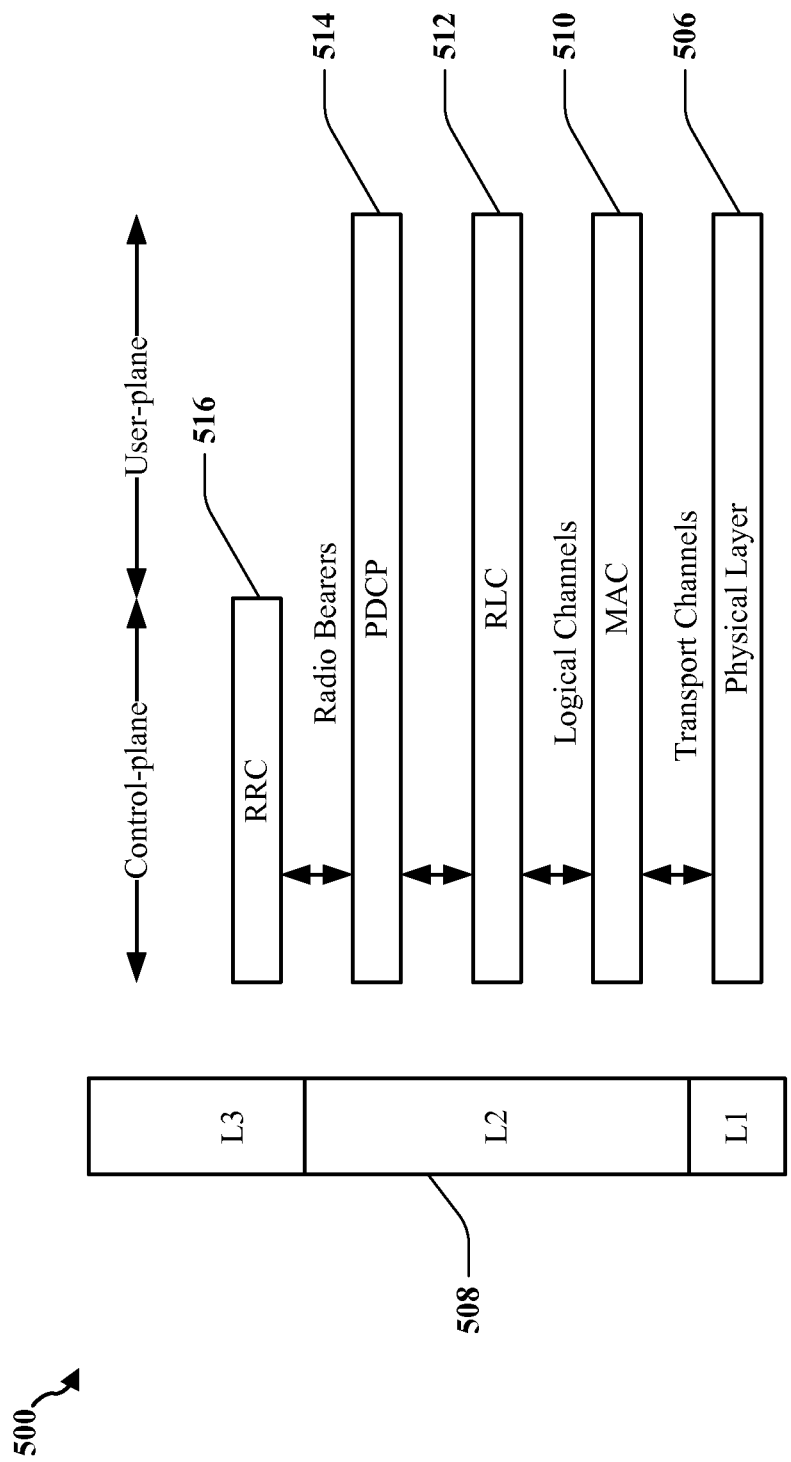
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
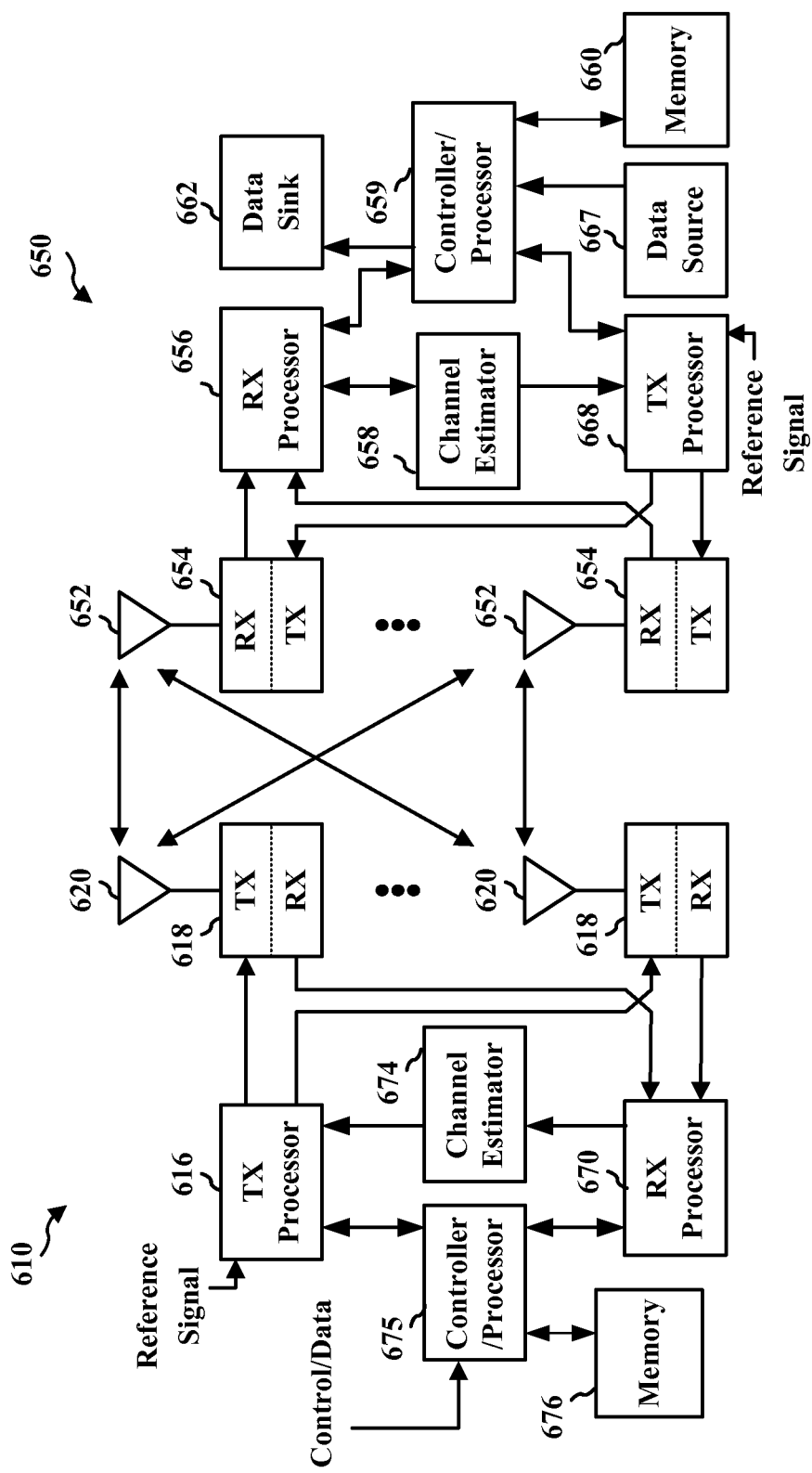
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
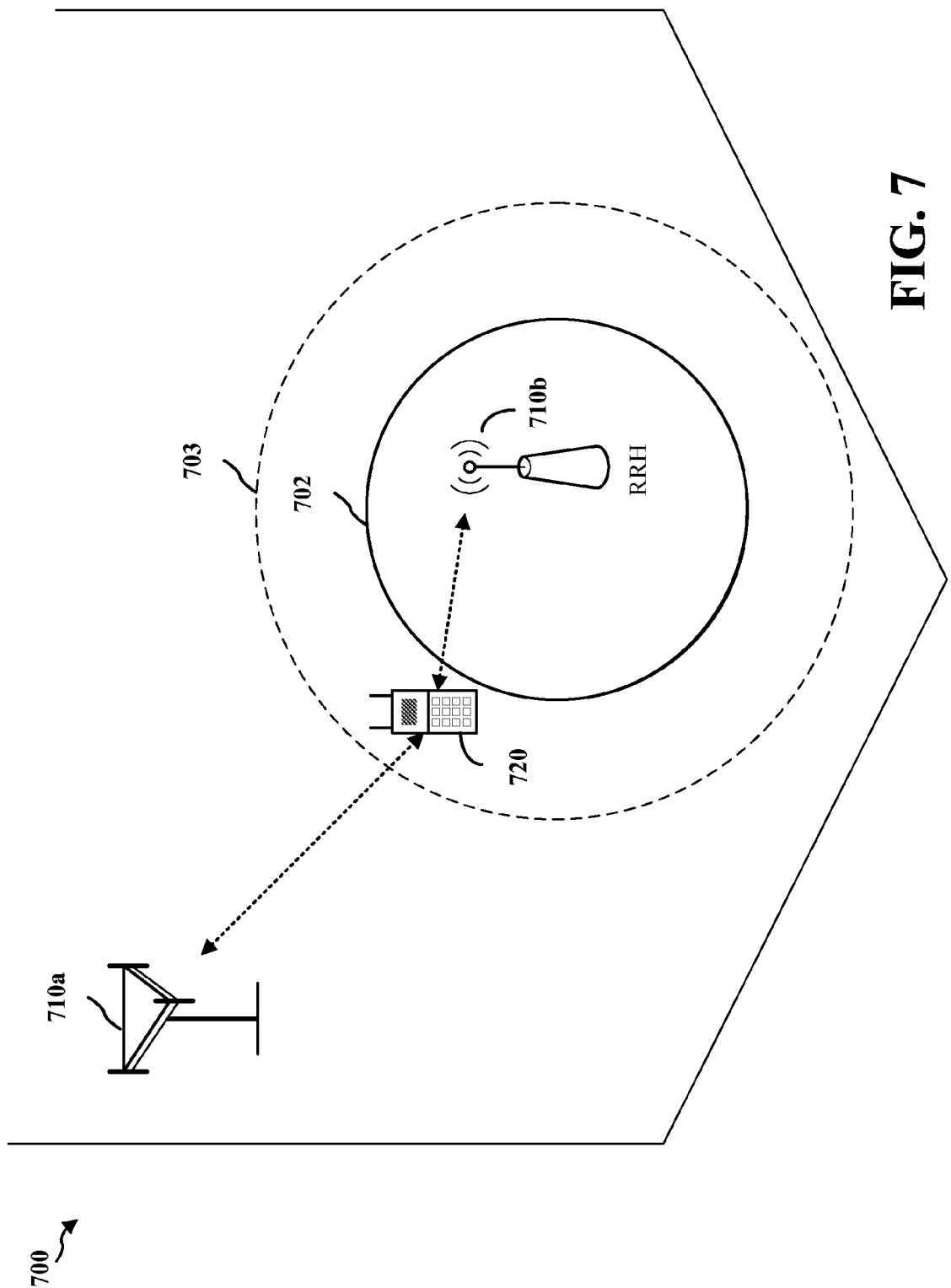
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancelation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

In a wireless wide area network (WWAN) scenario, communication between mobile terminals is facilitated through uplink/downlink channels between the mobile terminals and a base station (i.e., WWAN link). For various types of applications, such as social networking applications, for example, relatively small amounts of location update information need to be communicated relatively frequently in an efficient manner. Thus, there is a need for an efficient means of communicating a small amount of information frequently in a wireless communications system. Additionally, it would be advantageous if the frequent communication of the small amount of information did not require large amounts of signaling overhead. In the case that two communicating mobile terminals are in the vicinity of each other, direct peer-to-peer communication without passing through the base station may facilitate frequent communication of small amounts of information. Accordingly, there is also a need for a scheduling mechanism among a WWAN link and peer-to-peer links.

Peer mobile terminals or devices may establish direct peer-to-peer links without affecting the quality of existing WWAN communications. This may be accomplished by opportunistically establishing peer-to-peer links that are well suited for efficiently communicating small amounts of information relatively frequently in a wireless communications system and do not affect the quality of existing WWAN communications.

In an aspect, when a WWAN link does occupy all subframes, such as when the WWAN link is used for voice communication, for example, peer-to-peer links may be scheduled in an idle WWAN subframe without affecting the WWAN communication. The idle WWAN subframe may be indicated in a number of ways as described below. Using the described methods, peer devices may determine an idle WWAN subframe to use for peer-to-peer communication.

For example, in an LTE downlink, a physical downlink shared channel (PDSCH) is a physical channel used for unicast data transmission, and also for transmitting paging information. A physical downlink control channel (PDCCH) is used for sending downlink control information, such as scheduling decisions, required for reception of PDSCH, and for scheduling grants enabling transmission of PUSCH. Moreover, a physical control format indicator channel (PCFICH) is a channel providing terminals with information necessary to decode PDCCH. If the eNB decides that a subframe will be idle, meaning that no PDCCH and PDSCH will be sent, then the eNB will not send a PCFICH signal in connection with the PDCCH and/or PDSCH.

Accordingly, when a peer device does not detect the PCFICH signal in a first symbol of the subframe, the peer device may determine that the current downlink subframe is not used for an LTE downlink transmission. The peer device may then use the remaining symbols of the subframe for peer-to-peer communication.

In another example, the eNB may broadcast the location of an idle subframe in one of a plurality of system information block (SIB) messages. Upon the peer device learning of the idle subframe, the peer device may use the idle subframe for peer-to-peer communication.

In a further example, the eNB may broadcast a message in PDCCH to indicate that the current subframe is idle, or to indicate that a particular uplink subframe is idle. This message may be scrambled by a radio network temporary identifier (RNTI) that is known to all devices. In another example, an idle subframe may be indicated via radio resource control (RRC) signaling from the eNB.

Figure 8:
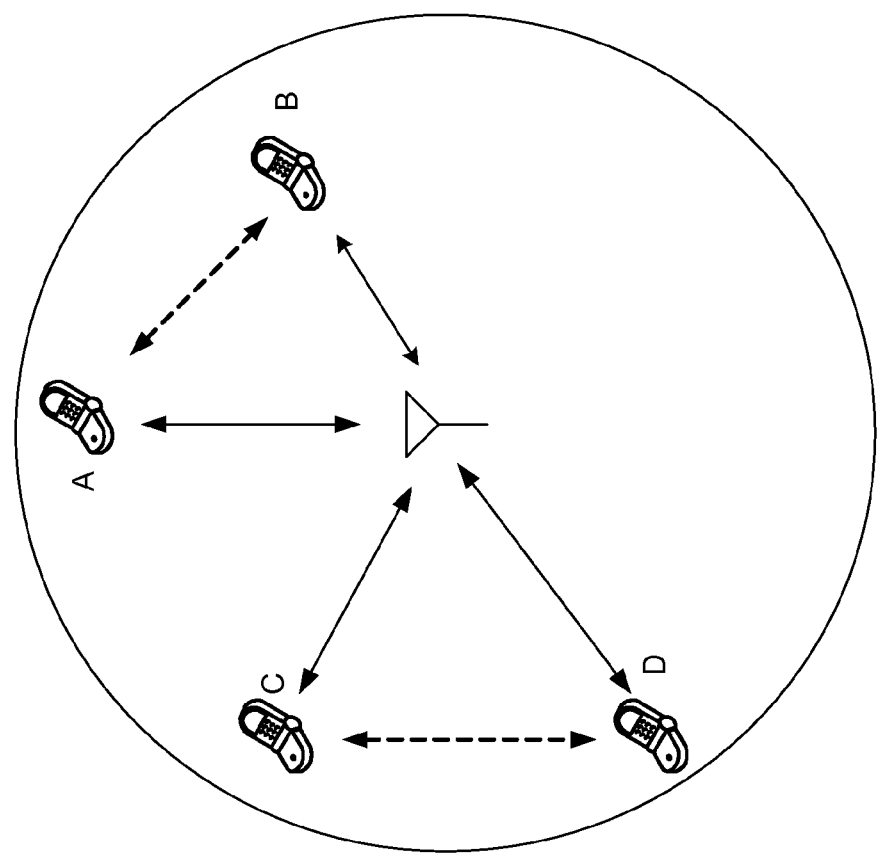
FIG. 8 is a diagram illustrating peer devices communicating via a wireless wide area network (WWAN) link and for describing opportunistic use of an idle WWAN subframe by the peer devices.
Figure 9:
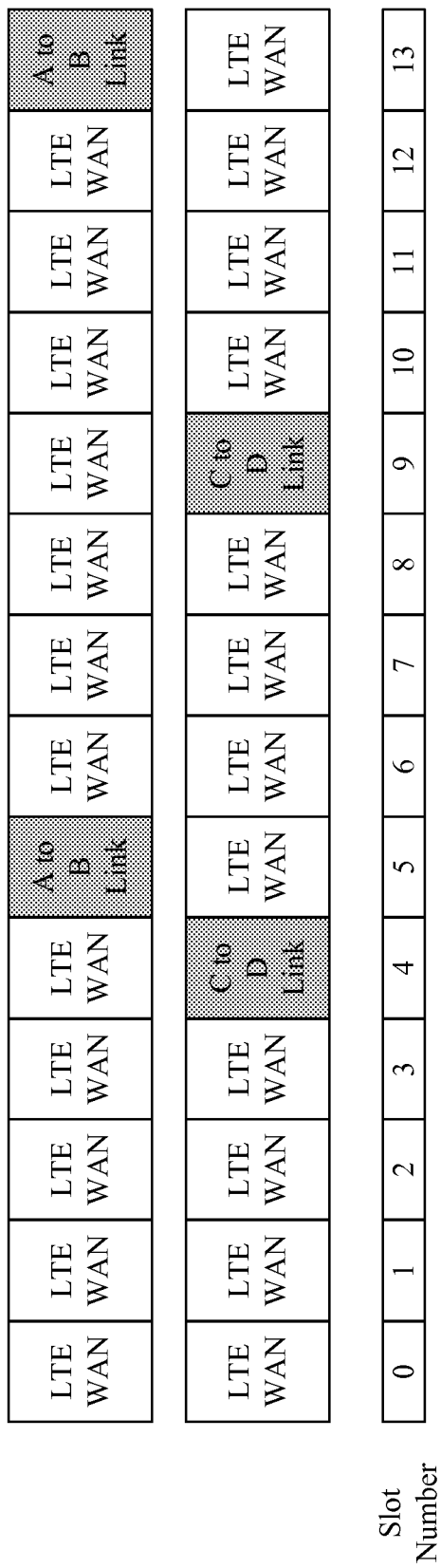
FIG. 9 is a diagram illustrating the occupation of WWAN resources due to WWAN communication between peer devices.

FIG. 8 is a diagram 800 illustrating peer devices communicating via a WWAN link and for describing opportunistic use of an idle WWAN subframe by the peer devices. FIG. 9 is a diagram 900 illustrating the occupation of WWAN resources due to WWAN communications between the peer devices of FIG. 8. Referring to FIGS. 8 and 9, and the examples described above, the peer devices can determine an idle WWAN subframe to be used for peer-to-peer communication.

Referring to FIG. 8, devices A and B have established voice communication with each other through the WWAN (i.e., a WWAN link between devices A and B), and devices C and D have established voice communication with each other through the WWAN (i.e. a WWAN link between devices C and D). Referring to FIG. 9, WWAN resources at subframes 5 and 13 may be occupied/utilized, for example, to facilitate the WWAN communication between the devices A and B (A to B Link). Furthermore, the WWAN resources at subframes 4 and 9 may be occupied/utilized, for example, to facilitate the WWAN communication between the devices C and D (C to D Link).

When any of the peer devices A, B, C, or D receives a broadcast signal indicating an idle WWAN subframe (e.g., subframes 0, 1, 2, 3, 6, 7, 8, 10, 11, or 12 in FIG. 9), via any of the examples described above, a peer device can opportunistically use the idle WWAN subframe to conduct direct peer-to-peer communication with a corresponding peer device without involving a base station or eNB. For example, when the device A learns of an idle WWAN subframe, the device A may directly communicate with the device B (peer-to-peer link), outside of the WWAN link between the devices A and B, using the idle WWAN subframe. Similarly, when the device D learns of an idle WWAN subframe, the device D may directly communicate with the device C (peer-to-peer link), outside of the WWAN link between the devices C and D, using the idle WWAN subframe.

Figure 10:
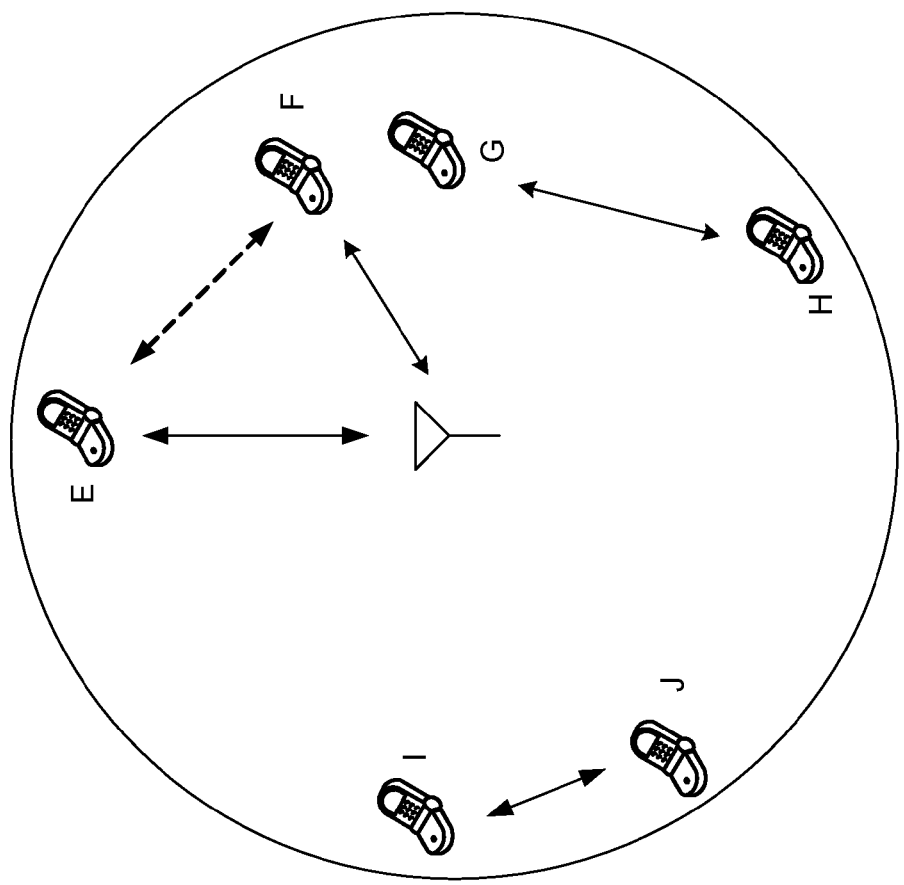
FIG. 10 is a diagram illustrating peer devices communicating via a WWAN link and for describing opportunistic use of a WWAN subframe dependent on a distance from the WWAN link.

FIG. 10 is a diagram 1000 illustrating peer devices communicating via a WWAN link and for describing opportunistic use of a WWAN subframe dependent on a distance from the WWAN link. FIG. 11 is a diagram 1100 illustrating the occupation of WWAN resources due to WWAN communication between devices E and F in FIG. 10. Referring to FIGS. 10 and 11, when a peer-to-peer link is far from a WWAN link such that interference caused by the peer-to-peer link is minimal, the peer-to-peer link may be scheduled using the same WWAN subframe occupied/utilized by the WWAN link. A FlashLinQ connection scheduling algorithm may be used to determine whether a peer-to-peer link causes interference to a WWAN link, for example.

In more detail, referring to FIG. 10, devices E and F have established voice communication through the WWAN (i.e., a WWAN link between devices E and F). Referring to FIG. 11, WWAN resources at subframes 5 and 13 may be occupied/utilized, for example, to facilitate the WWAN communication between the devices E and F (E to F Link). Referring to FIGS. 10 and 11, peer devices G and H may wish to establish direct communication with each other (i.e., a peer-to-peer link). Because the device G is geographically near the device F, direct peer-to-peer communication between the devices G and H may be facilitated in WWAN subframes not used by the E to F link without affecting the quality of the existing WWAN communication between the devices E and F. For example, as shown in FIG. 11, subframes 0, 1, 2, 3, 4, 6, 7, 8, 9 10, 11, or 12 that are not used by the E to F link may be used by the devices G and H to establish a direct peer-to-peer link with each other. Doing so will not affect the quality of the WWAN communication between the devices E and F using subframes 5 and 13.

Furthermore, still referring to FIG. 10, peer devices I and J may also wish to establish direct communication with each other, wherein the devices I and J are geographically far from the devices E and F. If the devices I and J are enough of a distance away from the devices E and F such that a peer-to-peer link between the devices I and J will not cause interference to the WWAN link between the devices E and F, then the direct peer-to-peer link between the devices I and J may not only be facilitated via the WWAN subframes unused by the E to F link, but may also be facilitated via the WWAN subframes used by the WWAN link between the devices E and F.

For example, as shown in FIG. 11, subframes 0, 1, 2, 3, 4, 6, 7, 8, 9 10, 11, or 12 that are not used by the E to F link may be used by the devices I and J to establish a direct peer-to-peer link with each other. Moreover, subframes 5 and 13, used by the devices E and F for WWAN communication may also be used by the devices I and J to establish the direct peer-to-peer link with each other so long as the peer-to-peer link between the devices I and J does not affect the quality of the WWAN communication between the devices E and F. A FlashLinQ connection scheduling algorithm may be used to determine whether the peer-to-peer link between the devices I and J causes interference to a WWAN link between the devices E and F, for example.

Figure 12:
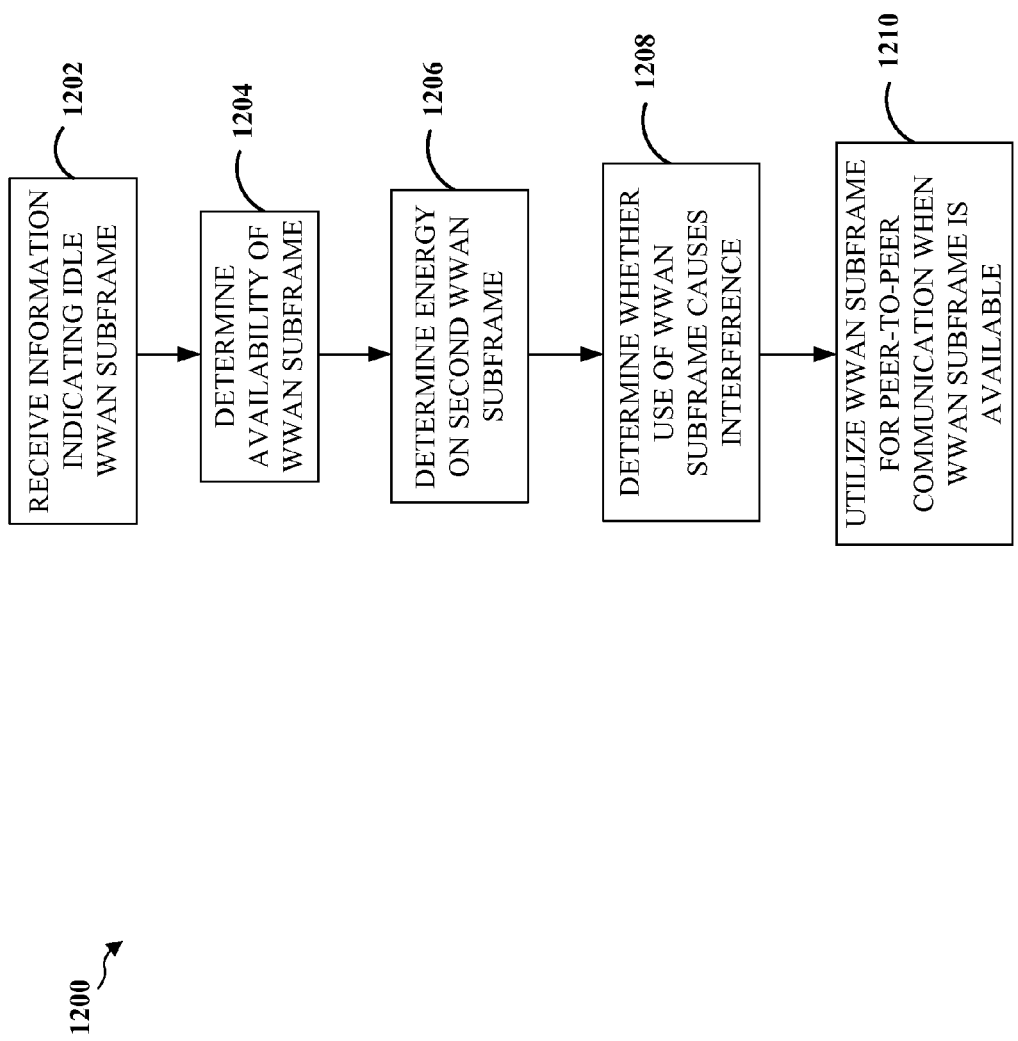
FIG. 12 is a flow chart of a method of wireless communication.

FIG. 12 is a flow chart 1200 of a method of wireless communication. The method may be performed by a wireless device. As shown in FIG. 12, at step 1202, the wireless device receives information indicating an idle WWAN subframe. The information may be received from an eNB or a UE communicating with the eNB. As discussed supra, the information may be conveyed to the wireless device in a number of ways. For example, when the wireless device does not detect a PCFICH signal in a first symbol of a WWAN subframe, then the wireless device may determine that the WWAN subframe is not used for a downlink transmission, and therefore an idle WWAN subframe. In other examples, the eNB may broadcast the location of an idle WWAN subframe in a system information block (SIB) message, broadcast a message in PDCCH to indicate that the WWAN subframe is idle, or indicate the idle WWAN subframe via radio resource control (RRC) signaling.

At step 1204, after the information indicating the idle WWAN subframe is received at step 1202, the wireless device determines the availability of the WWAN subframe for facilitating peer-to-peer communication. At step 1206, the wireless device determines an energy of a second WWAN subframe to help determine the availability of the WWAN subframe. At step 1208, based on the determined energy of the second WWAN subframe, the wireless device determines whether use of the WWAN subframe causes interference to WWAN communication facilitated via the second WWAN subframe. If use of the WWAN subframe is determined not to cause interference to the WWAN communication, then the wireless device determines the WWAN subframe to be available.

For example, the WWAN subframe may be a downlink subframe, the second WWAN subframe may be an uplink subframe, and the wireless device may determine the energy of the second WWAN subframe from an uplink transmission of a UE. Accordingly, the wireless device may determine whether use of the downlink subframe will cause interference based on whether peer-to-peer communication will cause interference to the UE. If the peer-to-peer communication will not cause interference to the UE, then the wireless device determines the downlink subframe to be available for the peer-to-peer communication.

In another example, the WWAN subframe may be an uplink subframe, the second WWAN subframe may be a downlink subframe, and the wireless device may determine the energy of the second WWAN subframe from a downlink transmission from an eNB. Accordingly, the wireless device may determine whether use of the uplink subframe will cause interference based on whether peer-to-peer communication will cause interference to the eNB. If the peer-to-peer communication will not cause interference to the eNB, then the wireless device determines the uplink subframe to be available for the peer-to-peer communication.

At step 1210, based on the determination at step 1208, when the WWAN subframe is available, the wireless device utilizes the available WWAN subframe for peer-to-peer communication.

Figure 13:
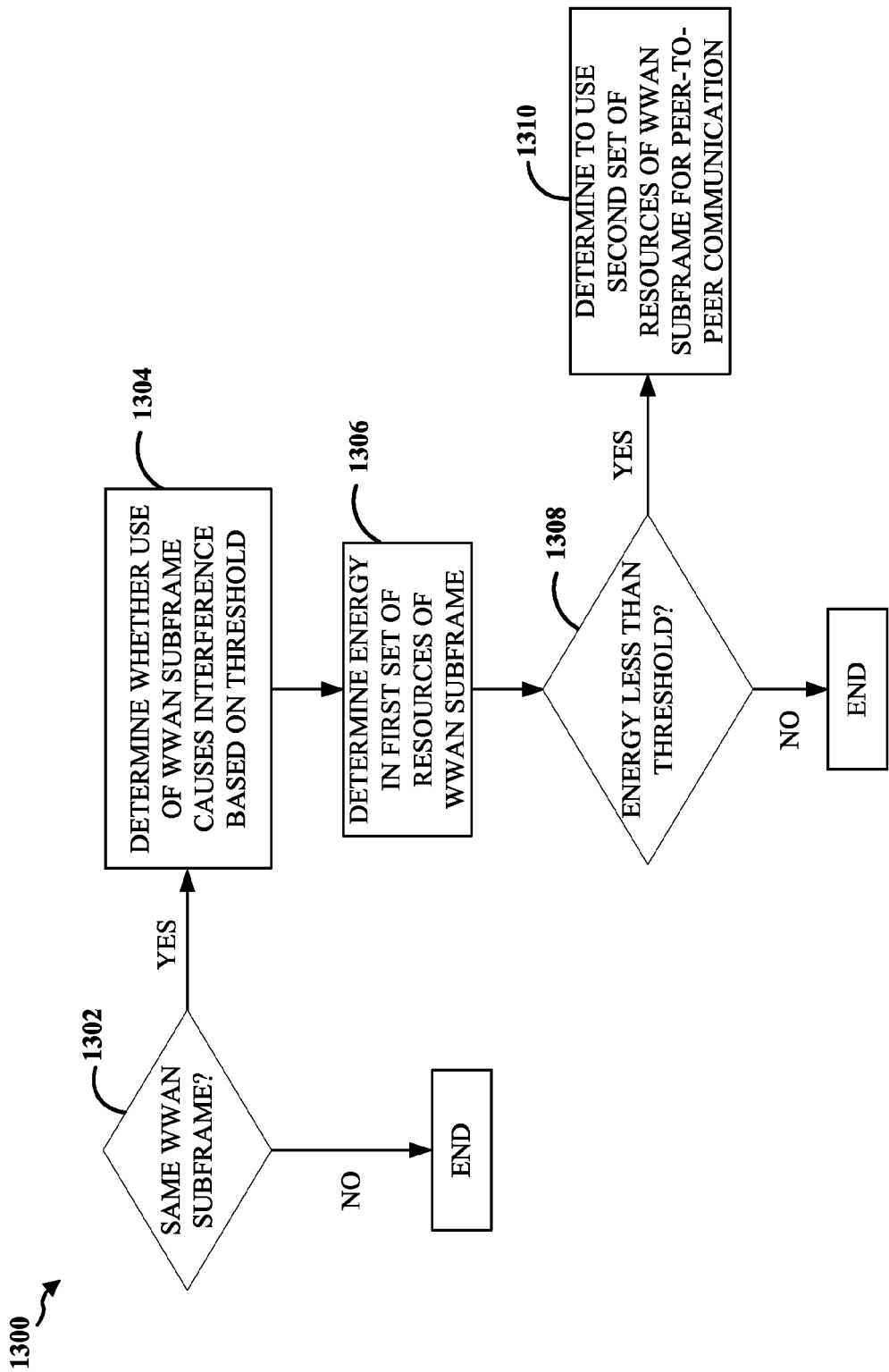
FIG. 13 is a flow chart of a method of wireless communication.

FIG. 13 is a flow chart 1300 of a method of wireless communication. The method may be performed by a wireless device. The method of FIG. 13 may be an aspect of steps 1206 and 1208 of FIG. 12, wherein an energy of a second WWAN subframe is determined, and based on the determined energy, the wireless device determines whether use of a WWAN subframe causes interference to WWAN communication facilitated via the second WWAN subframe.

At step 1302, the wireless device determines if the WWAN subframe and the second WWAN subframe are the same WWAN subframe. At step 1304, based on a positive determination at step 1302, the wireless device determines whether use of the WWAN subframe causes interference to WWAN communication according to a threshold.

Particularly, at step 1306, the wireless device determines an energy of a first set of resources of the WWAN subframe. At step 1308, based on an input from step 1306, the wireless device decides whether the determined energy is less than the threshold.

At step 1310, based on the determination at step 1308, the wireless device determines to use a second set of resources of the WWAN subframe for peer-to-peer communication when the determined energy is less than the threshold. The first set of resources may be a first set of OFDM symbols, and the second set of resources may be a second set of OFDM symbols. Moreover, the first set of OFDM symbols may be a first OFDM symbol including a physical control format indicator channel (PCFICH).

Figure 14:
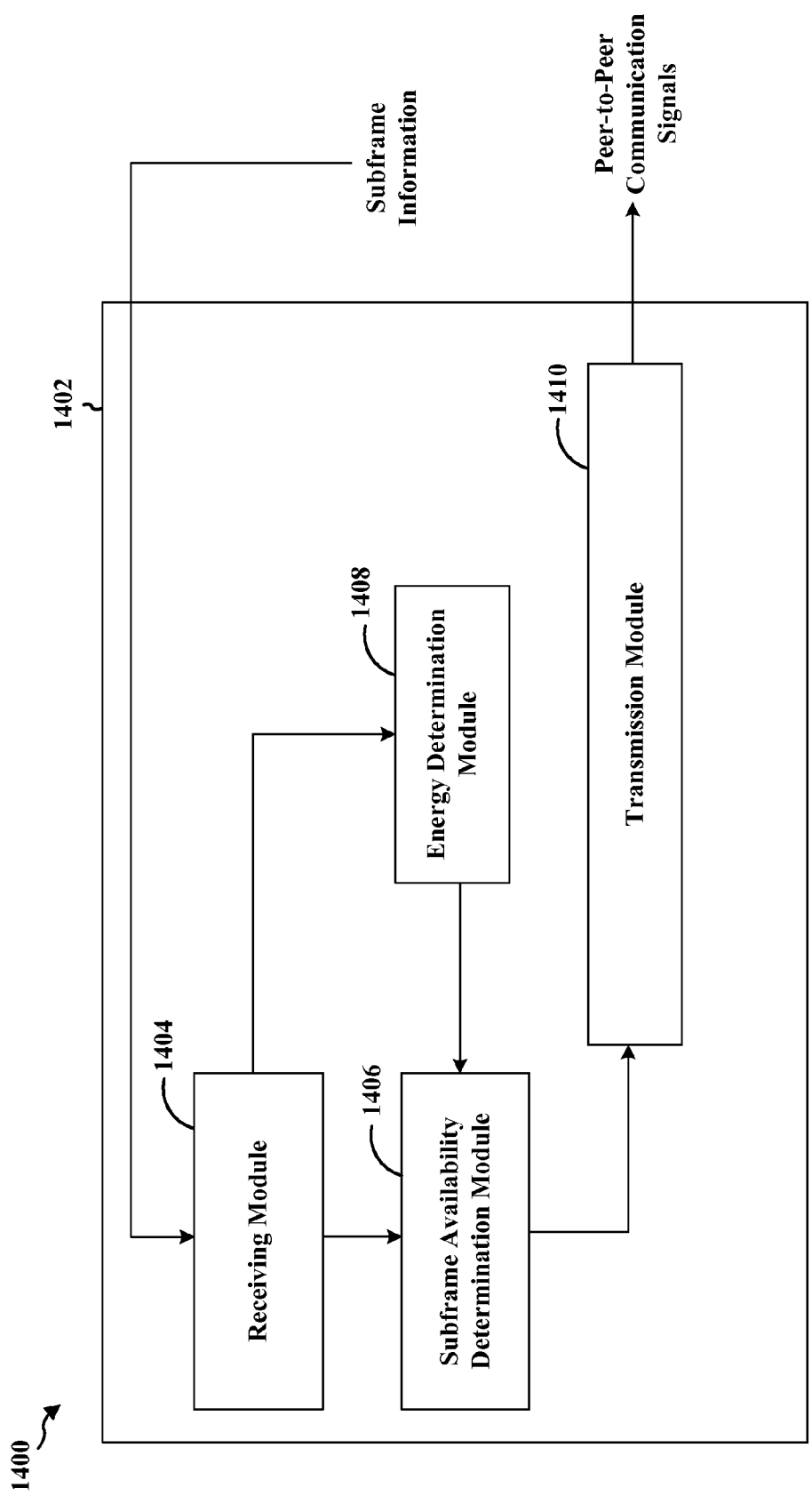
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus 1402 may be a wireless device. The apparatus 1402 includes a receiving module 1404, a subframe availability determination module 1406, an energy determination module 1408, and a transmission module 1410.

The receiving module 1404 may receive information indicating an idle WWAN subframe from an eNB or a UE communicating with the eNB. The information may be received in a number of ways. For example, when the receiving module 1404 does not detect a PCFICH signal in a first symbol of a WWAN subframe, then the receiving module 1404 may determine that the WWAN subframe is not used for a downlink transmission, and therefore an idle WWAN subframe. In other examples, the receiving module 1404 may receive a broadcasted message from the eNB, such as a system information block (SIB) message indicating the location of an idle WWAN subframe or a message in PDCCH indicating that the WWAN subframe is idle. The receiving module 1404 may also receive information indicating the idle WWAN subframe via radio resource control (RRC) signaling.

After the receiving module 1404 receives the information indicating the idle WWAN subframe, the subframe availability determination module 1406 determines the availability of the WWAN subframe for facilitating peer-to-peer communication. To help determine the availability of the WWAN subframe, the energy determination module 1408 may determine an energy of a second WWAN subframe. Based on the determined energy of the second WWAN subframe, the subframe availability determination module 1406 determines whether use of the WWAN subframe causes interference to WWAN communication facilitated via the second WWAN subframe. If use of the WWAN subframe is determined not to cause interference to the WWAN communication, then the subframe availability determination module 1406 determines that the WWAN subframe is available.

For example, the WWAN subframe may be a downlink subframe, the second WWAN subframe may be an uplink subframe, and the energy determination module 1408 may determine the energy of the second WWAN subframe from an uplink transmission of a UE. Accordingly, the subframe availability determination module 1406 may determine whether use of the downlink subframe will cause interference based on whether peer-to-peer communication will cause interference to the UE. If the peer-to-peer communication will not cause interference to the UE, then the subframe availability determination module 1406 determines the downlink subframe to be available for the peer-to-peer communication.

In another example, the WWAN subframe may be an uplink subframe, the second WWAN subframe may be a downlink subframe, and the energy determination module 1408 may determine the energy of the second WWAN subframe from a downlink transmission from an eNB. Accordingly, the subframe availability determination module 1406 may determine whether use of the uplink subframe will cause interference based on whether peer-to-peer communication will cause interference to the eNB. If the peer-to-peer communication will not cause interference to the eNB, then the subframe availability determination module 1406 determines the uplink subframe to be available for the peer-to-peer communication.

Based on the determination by the subframe availability determination module 1406, when the WWAN subframe is available, the subframe availability determination module 1406 facilitates sending communication signals via the transmission module 1410 to utilize the available WWAN subframe for peer-to-peer communication.

In an aspect, the subframe availability determination module 1406 may determine if the WWAN subframe and the second WWAN subframe are the same WWAN subframe. Based on a positive determination, the subframe availability determination module 1406 determines whether use of the WWAN subframe causes interference to WWAN communication according to a threshold. Particularly, the energy determination module 1408 may determine an energy of a first set of resources of the WWAN subframe. Thereafter, based on an input from the energy determination module 1408, the subframe availability determination module 1406 decides whether the determined energy is less than the threshold. When the determined energy is less than the threshold, the subframe availability determination module 1406 determines to use a second set of resources of the WWAN subframe for peer-to-peer communication.

The apparatus may include additional modules that perform each of the steps of the algorithm in the aforementioned flow charts FIGS. 12 and 13. As such, each step in the aforementioned flow charts FIGS. 12 and 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
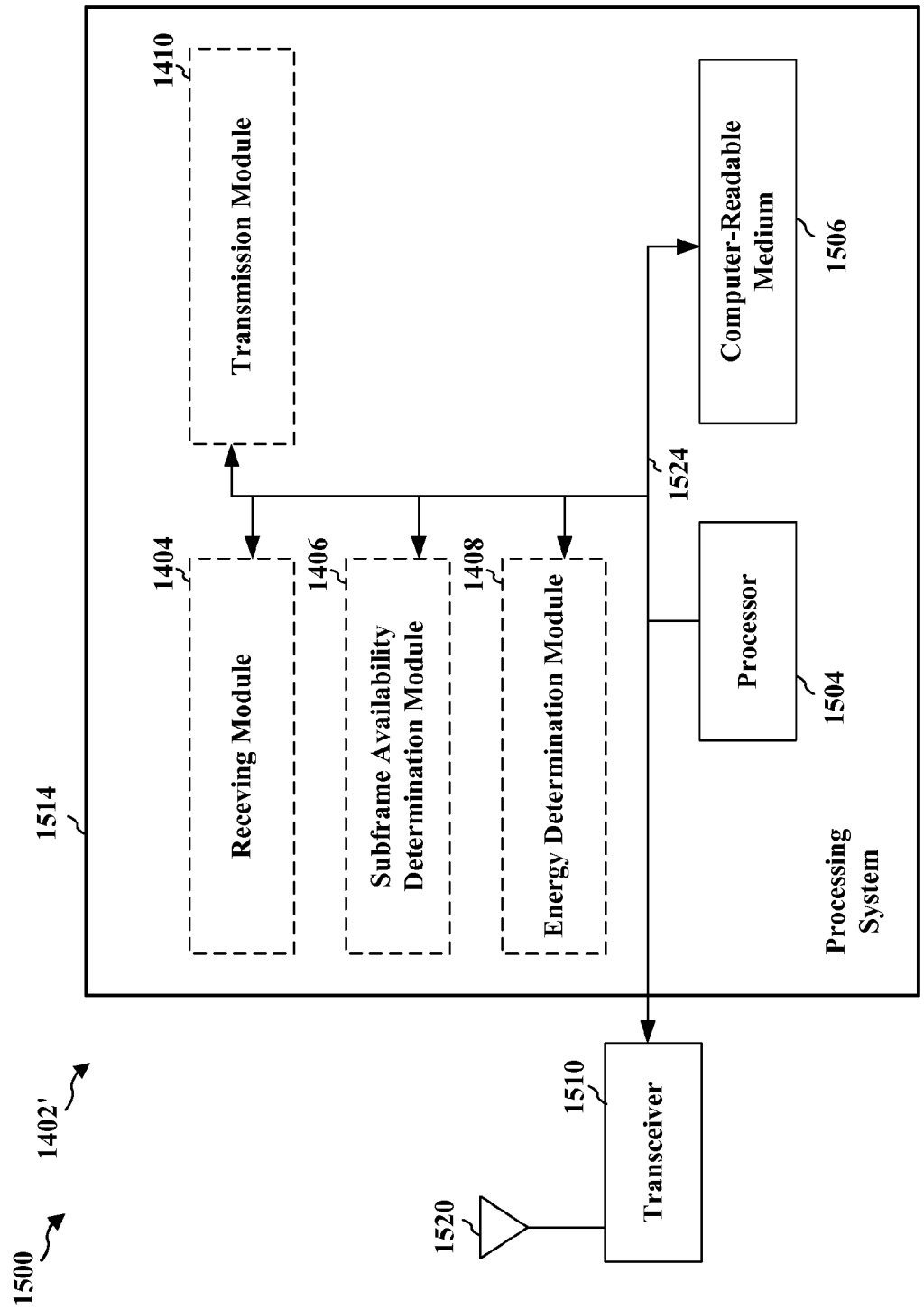
FIG. 15 is a diagram illustrating an example of a hardware implementation for an apparatus employing a processing system.

FIG. 15 is a diagram illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410 and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, and 1410. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for means for determining an availability of a wireless wide area network (WWAN) subframe and means for utilizing the WWAN subframe for peer-to-peer communication when the WWAN subframe is available. The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    receiving, by a user equipment (UE), information indicating one or more time slots of one or more wireless wide area network (WWAN) subframes that are idle;
    determining, by the UE, an availability of at least one time slot of a WWAN resource based on the received information, wherein the WWAN resource is an idle WWAN subframe, the idle WWAN subframe being a subset of a plurality of WWAN subframes, wherein each of the plurality of WWAN subframes is designated for WWAN communication between UEs via an evolved Node B (eNB), wherein the determining the availability of the WWAN resource comprises determining an energy of a second WWAN resource, wherein the WWAN resource is one of a downlink subframe or an uplink subframe, the energy is determined from one of an uplink transmission of a second user equipment (UE) or a downlink transmission of the eNB, and determining whether use of the downlink subframe or the uplink subframe will cause interference is based on whether a peer-to-peer communication will cause interference to the UE or the eNB respectively; and
    utilizing, by the UE, the WWAN resource for the peer-to-peer communication based on the determining of the availability.

2. The method of claim 1, wherein the receiving the information comprises:
    receiving the information from another UE having an established communication link.

3. The method of claim 1, wherein the information is received from the eNB.

4. The method of claim 1, wherein the information is received via a system information block (SIB) from the eNB, a physical downlink control channel (PDCCH), radio resource control (RRC) signaling, or non-detection of a physical control format indicator control channel (PCFICH).

5. The method of claim 1, wherein the second WWAN resource is an idle WWAN subframe, the idle WWAN subframe being a subset of a plurality of WWAN subframes, wherein each of the plurality of WWAN subframes is designated for WWAN communication between user equipments (UEs) via an evolved Node B (eNB); and
    determining whether use of the WWAN resource will cause interference to WWAN communication based on the determined energy of the second WWAN resource.

6. The method of claim 5, wherein the second WWAN resource is an uplink subframe when the WWAN resource is a downlink subframe.

7. The method of claim 5, wherein the second WWAN resource is a downlink subframe, when the WWAN resource is an uplink subframe.

8. The method of claim 5, wherein the WWAN resource and the second WWAN resource is the same WWAN resource, and the determining whether use of the WWAN resource will cause interference is based on whether the determined energy is less than a threshold.

9. The method of claim 8, wherein the energy is determined in a first set of resources in the WWAN resource, and the method further comprises determining to use a second set of resources in the WWAN resource for peer-to-peer communication based on whether the determined energy is less than the threshold.

10. The method of claim 9, wherein the first set of resources is a first set of orthogonal frequency division multiplexing (OFDM) symbols, and the second set of resources is a second set of OFDM symbols.

11. The method of claim 10, wherein the first set of OFDM symbols is a first OFDM symbol comprising a physical control format indicator control channel (PCFICH).

12. An apparatus for wireless communication, comprising:
    means for receiving, by the apparatus, information indicating one or more time slots of one or more wireless wide area network (WWAN) subframes that are idle;
    means for determining, by the apparatus, an availability of at least one time slot of a WWAN resource based on the received information, wherein the WWAN resource is an idle WWAN subframe, the idle WWAN subframe being a subset of a plurality of WWAN subframes, wherein each of the plurality of WWAN subframes is designated for WWAN communication between UEs via an evolved Node B (eNB), wherein the means for determining the availability of the WWAN resource is configured to determine an energy of a second WWAN resource, wherein the WWAN resource is one of a downlink subframe or an uplink subframe, the energy is determined from one of an uplink transmission of a second user equipment (UE) or a downlink transmission of the eNB, and determining whether use of the downlink subframe or the uplink subframe will cause interference is based on whether a peer-to-peer communication will cause interference to the UE or the eNB respectively; and means for utilizing, by the apparatus, the WWAN resource for the peer-to-peer communication based on the determining of the availability.

13. The apparatus of claim 12, wherein the means for receiving the information is configured to:
receive the information from a second UE having an established communication link.

14. The apparatus of claim 12, wherein the information is received from the eNB.

15. The apparatus of claim 12, wherein the information is received via a system information block (SIB) from the eNB, a physical downlink control channel (PDCCH), radio resource control (RRC) signaling, or non-detection of a physical control format indicator control channel (PCFICH).

16. The apparatus of claim 12, wherein the second WWAN resource is an idle WWAN subframe, the idle WWAN subframe being a subset of a plurality of WWAN subframes, wherein each of the plurality of WWAN subframes is designated for WWAN communication between user equipments (UEs) via an evolved Node B (eNB); and wherein the means for determining the availability of the WWAN resource is further configured to determine whether use of the WWAN resource will cause interference to WWAN communication based on the determined energy of the second WWAN resource.

17. The apparatus of claim 16, wherein the second WWAN resource is an uplink subframe when the WWAN resource is a downlink subframe.

18. The apparatus of claim 16, wherein the second WWAN resource is a downlink subframe, when the WWAN resource is an uplink subframe.

19. The apparatus of claim 16, wherein the WWAN resource and the second WWAN resource is the same WWAN resource, and determining whether use of the WWAN resource will cause interference is based on whether the determined energy is less than a threshold.

20. The apparatus of claim 19, wherein the energy is determined in a first set of resources in the WWAN resource, and the apparatus further comprises means for determining to use a second set of resources in the WWAN resource for peer-to-peer communication based on whether the determined energy is less than the threshold.

21. The apparatus of claim 20, wherein the first set of resources is a first set of orthogonal frequency division multiplexing (OFDM) symbols, and the second set of resources is a second set of OFDM symbols.

22. The apparatus of claim 21, wherein the first set of OFDM symbols is a first OFDM symbol comprising a physical control format indicator control channel (PCFICH).

23. An apparatus for wireless communication, comprising:
a memory; and
at least one processor coupled to the memory and configured to:
receive, by the apparatus, information indicating one or more time slots of one or more wireless wide area network (WWAN) subframes that are idle;
determine, by the apparatus, an availability of at least one time slot of a WWAN resource based on the received information, wherein the WWAN resource is the idle WWAN subframe, the idle WWAN subframe being a subset of a plurality of WWAN subframes, wherein each of the plurality of WWAN subframes is designated for WWAN communication between UEs via an evolved Node B (eNB), wherein to determine the availability of the WWAN resource, the at least one processor is configured to determine an energy of a second WWAN resource, wherein the WWAN resource is one of a downlink subframe or an uplink subframe, the energy is determined from one of an uplink transmission of a second user equipment (UE) or a downlink transmission of the eNB, and the at least one processor determines whether use of the downlink subframe or the uplink subframe will cause interference based on whether a peer-to-peer communication will cause interference to the UE or the eNB respectively; and
utilize, by the apparatus, the WWAN resource for the peer-to-peer communication based on the determination of the availability.

24. The apparatus of claim 23, wherein to receive the information, the at least one processor is configured to:
receive the information from another UE having an established communication link.

25. The apparatus of claim 23, wherein the information is received from the eNB.

26. The apparatus of claim 23, wherein the information is received via a system information block (SIB) from the eNB, a physical downlink control channel (PDCCH), radio resource control (RRC) signaling, or non-detection of a physical control format indicator control channel (PCFICH).

27. The apparatus of claim 23, wherein the second WWAN resource is an idle WWAN subframe, the idle WWAN subframe being a subset of a plurality of WWAN subframes, wherein each of the plurality of WWAN subframes is designated for WWAN communication between user equipments (UEs) via an evolved Node B (eNB); and wherein to determine the availability of the WWAN resource, the at least one processor is further configured to determine whether use of the WWAN resource will cause interference to WWAN communication based on the determined energy of the second WWAN resource.

28. The apparatus of claim 27, wherein the second WWAN resource is an uplink subframe when the WWAN resource is an downlink subframe.

29. The apparatus of claim 27, wherein the second WWAN resource is a downlink subframe, when the WWAN resource is an uplink subframe.

30. The apparatus of claim 27, wherein the WWAN resource and the second WWAN resource is the same WWAN resource, and the at least one processor determines whether use of the WWAN resource will cause interference based on whether the determined energy is less than a threshold.

31. The apparatus of claim 30, wherein the energy is determined in a first set of resources in the WWAN resource, and the at least one processor is further configured to determine to use a second set of resources in the WWAN resource for peer-to-peer communication based on whether the determined energy is less than the threshold.

32. The apparatus of claim 31, wherein the first set of resources is a first set of orthogonal frequency division multiplexing (OFDM) symbols, and the second set of resources is a second set of OFDM symbols.

33. The apparatus of claim 32, wherein the first set of OFDM symbols is a first OFDM symbol comprising a physical control format indicator control channel (PCFICH).

34. A non-transitory computer-readable medium storing computer-executable code for a user equipment (UE), comprising code to:
receive, by the UE, information indicating one or more time slots of one or more wireless wide area network (WWAN) subframes that are idle;
determine, by the UE, an availability of at least one time slot of a WWAN resource based on the received information, wherein the WWAN resource is an idle WWAN subframe, the idle WWAN subframe being a subset of a plurality of WWAN subframes, wherein each of the plurality of WWAN subframes is designated for WWAN communication between UEs via an evolved Node B (eNB), wherein the code for determining the availability of the WWAN resource comprises code to determine an energy of a second WWAN resource, wherein the WWAN resource is one of a downlink subframe or an uplink subframe, the energy is determined from one of an uplink transmission of a second user equipment (UE) or a downlink transmission of the eNB, and determining whether use of the downlink subframe or the uplink subframe will cause interference is based on whether a peer-to-peer communication will cause interference to the UE or the eNB respectively; and utilize, by the UE, the WWAN resource for the peer-to-peer communication based on the determination of the availability.

35. The non-transitory computer-readable medium of claim 34, wherein the code to receive the information comprises code to:

receive the information from another UE having an established communication link.

36. The non-transitory computer-readable medium of claim 34, wherein the information is received from the eNB.

37. The non-transitory computer-readable medium of claim 34, wherein the information is received via a system information block (SIB) from the eNB, a physical downlink control channel (PDCCH), radio resource control (RRC) signaling, or non-detection of a physical control format indicator control channel (PCFICH).

38. The non-transitory computer-readable medium of claim 34, wherein the second WWAN resource is an idle WWAN subframe, the idle WWAN subframe being a subset of a plurality of WWAN subframes, wherein each of the plurality of WWAN subframes is designated for WWAN communication between user equipments (UEs) via an evolved Node B (eNB); and wherein the code for determining the availability of the WWAN resource further comprises code to determine whether use of the WWAN resource will cause interference to WWAN communication based on the determined energy of the second WWAN resource.

39. The non-transitory computer-readable medium of claim 38, wherein the second WWAN resource is an uplink subframe when the WWAN resource is an downlink subframe.

40. The non-transitory computer-readable medium of claim 38, wherein the second WWAN resource is a downlink subframe, when the WWAN resource is an uplink subframe.

41. The non-transitory computer-readable medium of claim 38, wherein the WWAN resource and the second WWAN resource is the same WWAN resource, and the determination of whether use of the WWAN resource will cause interference is based on whether the determined energy is less than a threshold.

42. The non-transitory computer-readable medium of claim 41, wherein the energy is determined in a first set of resources in the WWAN resource, and the non-transitory computer-readable medium further comprises code to determine to use a second set of resources in the WWAN resource for peer-to-peer communication based on whether the determined energy is less than the threshold.

43. The non-transitory computer-readable medium of claim 42, wherein the first set of resources is a first set of orthogonal frequency division multiplexing (OFDM) symbols, and the second set of resources is a second set of OFDM symbols.

44. The non-transitory computer-readable medium of claim 43, wherein the first set of OFDM symbols is a first OFDM symbol comprising a physical control format indicator control channel (PCFICH).

* * * * *